US012686283B1

(12) United States Patent
Jia et al.

(10) Patent No.: US 12,686,283 B1
(45) Date of Patent: Jul. 21, 2026

(54) ENERGY CONVERSION CIRCUIT, CONTROL METHOD BASED ON ENERGY CONVERSION CIRCUIT, AND VEHICLE

(71) Applicant: SHINRY TECHNOLOGIES CO., LTD., Shenzhen (CN)

(72) Inventors: Minli Jia, Shenzhen (CN); Hao Sun, Shenzhen (CN); Jinlong Chen, Shenzhen (CN); Jifang Xie, Shenzhen (CN); Renhua Wu, Shenzhen (CN)

(73) Assignee: SHINRY TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/382,984

(22) Filed: Nov. 7, 2025

(30) Foreign Application Priority Data

Jan. 8, 2025 (CN) .......................... 202510025763.X

(51) Int. Cl.
| | |
|---|---|
| *H02M 3/00* | (2006.01) |
| *B60L 15/00* | (2006.01) |
| *H02M 1/00* | (2006.01) |
| *H02M 3/335* | (2006.01) |

(52) U.S. Cl.
CPC ......... *B60L 15/007* (2013.01); *H02M 1/0043* (2021.05); *H02M 1/0058* (2021.05); *H02M 3/01* (2021.05); *H02M 3/33573* (2021.05); *H02M 3/33592* (2013.01); *B60L 2210/30* (2013.01); *B60L 2210/40* (2013.01)

(58) Field of Classification Search
CPC .................................................. H02M 1/0043
See application file for complete search history.

(56) References Cited

U.S. PATENT DOCUMENTS

| | | | |
|---|---|---|---|
| 2011/0103097 A1 | 5/2011 | Wang et al. | |
| 2011/0317452 A1* | 12/2011 | Anguelov | H02M 3/3376 |
| | | | 363/21.02 |
| 2016/0079862 A1 | 3/2016 | Stephens et al. | |

FOREIGN PATENT DOCUMENTS

| | | | |
|---|---|---|---|
| CN | 101777844 A | 7/2010 | |
| CN | 109525119 A | 3/2019 | |
| CN | 115242108 A * | 10/2022 | H02M 5/10 |

(Continued)

OTHER PUBLICATIONS

The first office action issued in corresponding CN application No. 202510025763.X dated Mar. 26, 2025.

(Continued)

*Primary Examiner* — Daniel Kessie
(74) *Attorney, Agent, or Firm* — Scully, Scott, Murphy & Presser, P.C.

(57) ABSTRACT

An energy conversion circuit, a control method based on the energy conversion circuit, and a vehicle are provided. The energy conversion circuit includes a primary bridge arm module, a resonant module, a secondary bridge arm module, and a control module. The primary bridge arm module includes a first bridge arm and a second bridge arm, and the secondary bridge arm module includes a first secondary switch and a second secondary switch. A drive signal for the first bridge arm, a drive signal for the second bridge arm, a drive signal for the first secondary switch, and a drive signal for the second secondary switch are controlled by the control module, to increase a voltage between the first DC positive terminal and the first DC negative terminal to a preset voltage.

13 Claims, 8 Drawing Sheets

(56)                    References Cited

FOREIGN PATENT DOCUMENTS

| | | |
|---|---|---|
| CN | 117977970 A | 5/2024 |
| KR | 101693587 B1 | 1/2017 |
| WO | 2022167062 A1 | 8/2022 |
| WO | 2023185198 A1 | 10/2023 |

OTHER PUBLICATIONS

The second office action issued in corresponding CN application No. 202510025763.X dated Apr. 17, 2025.

Notification to grant patent right for invention issued in corresponding CN application No. 202510025763.X dated May 1, 2025.

Jia Pengyu et al., "Derivation and Analysis of a Secondary-Side LLC Resonant Converter for the High Step-Up Applications", IEEE Journal of Emerging and Selected Topics in Power Electronics, vol. 9, No. 5, dated Nov. 16, 2020.

Jin Ning-Zhi et al., "Bidirectional CLLLC Resonant Converter Based on Frequency-Conversion and Phase-Shift Hybrid Control", Electronics, vol. 12, No. 7, dated Mar. 29, 2023.

Park Junsung et al., "Design and Control of a Bi-directional Resonant DC-DC Converter for Automotive Engine/Battery Hybrid Power Generators", 2013 IEEE ECCE Asia Downunder IEEE, dated Jun. 3, 2013.

Park Junsung et al., "Design and Control of a Bidirectional Resonant DC-DC Converter for Automotive Engine/Battery Hybrid Power Generators", IEEE Transactions on Power Electronics, vol. 29, No. 7, dated Jul. 1, 2014.

Extended European search report issued in corresponding European application No. 25214429.0 dated Mar. 25, 2026.

* cited by examiner

CONTROL, BY THE CONTROL MODULE, THE DRIVE SIGNAL FOR THE FIRST BRIDGE ARM, THE DRIVE SIGNAL FOR THE SECOND BRIDGE ARM, THE DRIVE SIGNAL FOR THE FIRST SECONDARY SWITCH, AND THE DRIVE SIGNAL FOR THE SECOND SECONDARY SWITCH, TO INCREASE THE VOLTAGE BETWEEN THE FIRST DC POSITIVE TERMINAL AND THE FIRST DC NEGATIVE TERMINAL TO THE PRESET VOLTAGE; WHERE DURING THE INCREASE OF THE VOLTAGE BETWEEN THE FIRST DC POSITIVE TERMINAL AND THE FIRST DC NEGATIVE TERMINAL, THE SWITCHES IN THE SECONDARY BRIDGE ARM MODULE ARE TURNED OFF AT ZERO CURRENT

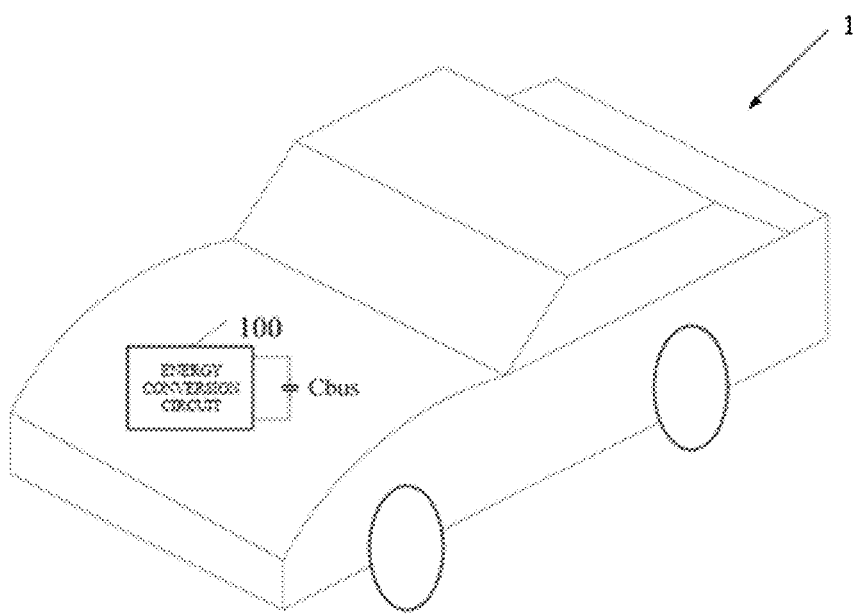

FIG. 11

ENERGY CONVERSION CIRCUIT, CONTROL METHOD BASED ON ENERGY CONVERSION CIRCUIT, AND VEHICLE

CROSS-REFERENCE TO RELATED APPLICATIONS

This application claims priority to Chinese Patent Application No. 202510025763.X, filed Jan. 8, 2025, the entire disclosure of which is incorporated herein by reference.

TECHNICAL FIELD

This disclosure relates to the field of electronic circuit technology, and in particular, to an energy conversion circuit, a control method based on an energy conversion circuit, and a vehicle.

BACKGROUND

In an electric vehicle, a switching switch and a filter capacitor of a certain capacity are usually placed between a high-voltage battery and a direct current (DC) bus of an electric drive. When the vehicle starts, the switch is turned on, and the high-voltage battery supplies power to the DC bus. Since the voltage of a capacitor is zero in the initial state, if the high-voltage battery directly charges a bus capacitor through the DC bus, an inrush current will be generated, posing a safety risk. To suppress the impact of the inrush current on a circuit, a pre-charge circuit is usually used to pre-charge the bus capacitor before vehicle start-up.

In the traditional pre-charge method, the bus capacitor is charged by additionally providing a pre-charge resistor. To reduce system cost and eliminate the pre-charge resistor, at present, a bidirectional direct current/direct current (DC/DC) converter is usually used to convert the electrical energy of a low-voltage battery into high-voltage electrical energy to charge the bus capacitor in advance.

SUMMARY

An energy conversion circuit is provided in a first aspect of embodiments of the disclosure. The energy conversion circuit includes a primary bridge arm module, a resonant module, a secondary bridge arm module, and a control module. The primary bridge arm module includes a first bridge arm and a second bridge arm, and the secondary bridge arm module includes a first secondary switch and a second secondary switch.

A bridge arm midpoint of the second bridge arm is connected to a first end of the resonant module, and a bridge arm midpoint of the first bridge arm is connected to a second end of the resonant module. A third end of the resonant module is connected to a first terminal of the second secondary switch, and a fourth end of the resonant module is connected to a first terminal of the first secondary switch. A first end of the first bridge arm is connected to a first end of the second bridge arm and a first direct current (DC) positive terminal, a second end of the first bridge arm is connected to a second end of the second bridge arm and a first DC negative terminal, a fifth end of the resonant module is connected to a second DC positive terminal, and a second terminal of the first secondary switch is connected to a second terminal of the second secondary switch and a second DC negative terminal.

A drive signal for the first bridge arm, a drive signal for the second bridge arm, a drive signal for the first secondary switch, and a drive signal for the second secondary switch are controlled by the control module, to increase a voltage between the first DC positive terminal and the first DC negative terminal to a preset voltage. During an increase in the voltage between the first DC positive terminal and the first DC negative terminal, switches in the secondary bridge arm module are turned off at zero current.

The resonant module includes a resonant inductor, a resonant capacitor, and a transformer. The transformer includes a primary winding, a first secondary winding, and a second secondary winding.

The resonant inductor and the resonant capacitor both are connected in series with the primary winding, and the first secondary winding is connected in series with the second secondary winding. The resonant inductor, the resonant capacitor, and the primary winding are connected in series between the bridge arm midpoint of the first bridge arm and the bridge arm midpoint of the second bridge arm. A first end of the first secondary winding is connected to a second end of the second secondary winding and the second DC positive terminal. A second end of the first secondary winding is connected to the first terminal of the first secondary switch. A first end of the second secondary winding is connected to the first terminal of the second secondary switch.

The drive signal for the first bridge arm, the drive signal for the second bridge arm, the drive signal for the first secondary switch, and the drive signal for the second secondary switch being controlled by the control module, to increase the voltage between the first DC positive terminal and the first DC negative terminal to the preset voltage, and during the increase in the voltage between the first DC positive terminal and the first DC negative terminal, the switches in the secondary bridge arm module being turned off at zero current, include the following.

A gain of the energy conversion circuit is determined by the control module according to a first sampled voltage, a second sampled voltage, and a turns ratio of the transformer. The first sampled voltage is a sampled voltage between the first DC positive terminal and the first DC negative terminal, and the second sampled voltage is a sampled voltage between the second DC positive terminal and the second DC negative terminal.

On condition that the gain of the energy conversion circuit is less than 1, the drive signal for the first bridge arm, the drive signal for the second bridge arm, the drive signal for the first secondary switch, and the drive signal for the second secondary switch are controlled by the control module, to make switches in the primary bridge arm module operate in a synchronous rectification mode, and to make the switches in the secondary bridge arm module turned off at zero current.

On condition that the gain of the energy conversion circuit is greater than or equal to 1, a phase-shift angle of the first bridge arm relative to the first secondary switch is determined by the control module as a first phase-shift angle, and a phase-shift angle of the second bridge arm relative to the first secondary switch is determined by the control module as a second phase-shift angle, to make the switches in the primary bridge arm module turned on at zero voltage and the switches in the secondary bridge arm module turned off at zero current. The first phase-shift angle and the second phase-shift angle being equal, or the first phase-shift angle and the second phase-shift angle being not equal.

A control method based on the energy conversion circuit is provided in a second aspect of embodiments of the disclosure. The control method is applied to the energy conversion circuit of the first aspect of embodiments of the disclosure. The control method includes: controlling, by the control module, the drive signal for the first bridge arm, the drive signal for the second bridge arm, the drive signal for the first secondary switch, and the drive signal for the second secondary switch, to increase the voltage between the first DC positive terminal and the first DC negative terminal to the preset voltage.

A vehicle is provided in a third aspect of embodiments of the disclosure. The vehicle includes the energy conversion circuit of the first aspect of embodiments of the disclosure and a bus capacitor. Two terminals of the bus capacitor are respectively connected to the first DC positive terminal and the first DC negative terminal of the energy conversion circuit. The energy conversion circuit is configured to charge the bus capacitor.

BRIEF DESCRIPTION OF THE DRAWINGS

In order to describe technical solutions of embodiments of the disclosure more clearly, the following will give a brief introduction to the accompanying drawings used for describing the embodiments or the related art. Apparently, the accompanying drawings hereinafter described are some embodiments of the disclosure. Based on these drawings, those of ordinary skill in the art can also obtain other drawings without creative effort.

FIG. 10 is a schematic flowchart of a control method based on an energy conversion circuit provided in an embodiment of the disclosure.

FIG. 11 is a schematic structural view of a vehicle provided in an embodiment of the disclosure.

DETAILED DESCRIPTION

The following describes the technical solutions in the embodiments of the disclosure with reference to the accompanying drawings in the embodiments of the disclosure. Apparently, the described embodiments are only some rather than all of the embodiments of the disclosure. All other embodiments obtained by one of ordinary skilled in the art based on embodiments of the disclosure without creative efforts shall fall within the protection scope of the disclosure.

In the specification, claims, and accompanying drawings of the disclosure, the terms "first", "second", and the like are intended to distinguish between different objects but do not indicate a particular order. In addition, the terms "including" and "having" and any other variants thereof are intended to cover a non-exclusive inclusion. For example, a process, a system, a product, or a device that includes a series of steps or units is not limited to the listed steps or units, but optionally further includes an unlisted step or unit, or optionally further includes another inherent step or unit of the process, the product, or the device.

An "embodiment" mentioned in the specification means that a particular feature, structure, or characteristic described with reference to this embodiment may be included in at least one embodiment of the disclosure. The phrase shown in various locations in this specification may not necessarily refer to a same embodiment, and is not an independent or optional embodiment exclusive from another embodiment. It is explicitly and implicitly understood by persons skilled in the art that embodiments described in the specification may be combined with another embodiment.

During the reverse pre-charging, the control method of the bidirectional DC/DC converter is usually based on soft-switching control, so that a switch transistor in a low-voltage side undergoes hard turn-off with a large turn-off current, and an excessively high resonant voltage is generated across the switch transistor, resulting in high voltage stress on the switch transistor, thereby causing damage to the switch transistor. An energy conversion circuit, a control method based on an energy conversion circuit, and a vehicle are provided in embodiments of the disclosure, which can reduce the voltage stress on switches in the energy conversion circuit.

Figure 1:
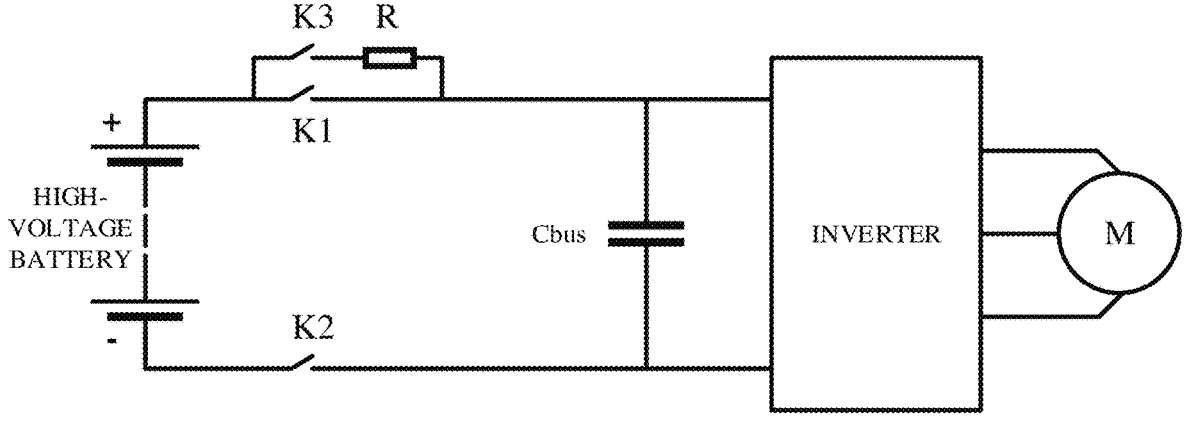
FIG. 1 is a schematic structural diagram of a pre-charge circuit in a vehicle provided in an embodiment of the disclosure.

Reference is made to FIG. 1, which is a schematic structural diagram of a pre-charge circuit in a vehicle provided in an embodiment of the disclosure. As illustrated in FIG. 1, when the vehicle starts, since the voltage across a bus capacitor $C_{bus}$ is zero, if K1 and K2 are directly turned on to enable a high-voltage battery to charge the bus capacitor $C_{bus}$, an inrush current will be generated, posing a safety risk. To suppress the impact of the inrush current on a circuit, the pre-charge circuit (such as switches K2, K3, and a pre-charge resistor R illustrated in FIG. 1) is usually used to charge the bus capacitor. The pre-charge resistor R functions to limit current. The bus capacitor $C_{bus}$ may also be referred to as a pre-charge capacitor. In FIG. 1, an inverter and a motor M are also included. The inverter can convert the voltage of the high-voltage battery into an alternating voltage to supply power to the motor M. The operating principle of FIG. 1 is as follows. First, K2 and K3 are turned on, K1 is turned off, and the bus capacitor $C_{bus}$ is charged through the pre-charge circuit. When the voltage of the bus capacitor $C_{bus}$ reaches or approaches the voltage of the high-voltage battery, K1 and K2 are turned on, K3 is turned off, and the inverter is started to work, thereby driving the motor M. The high-voltage battery in FIG. 1 may be a power battery of the vehicle.

Figure 2:
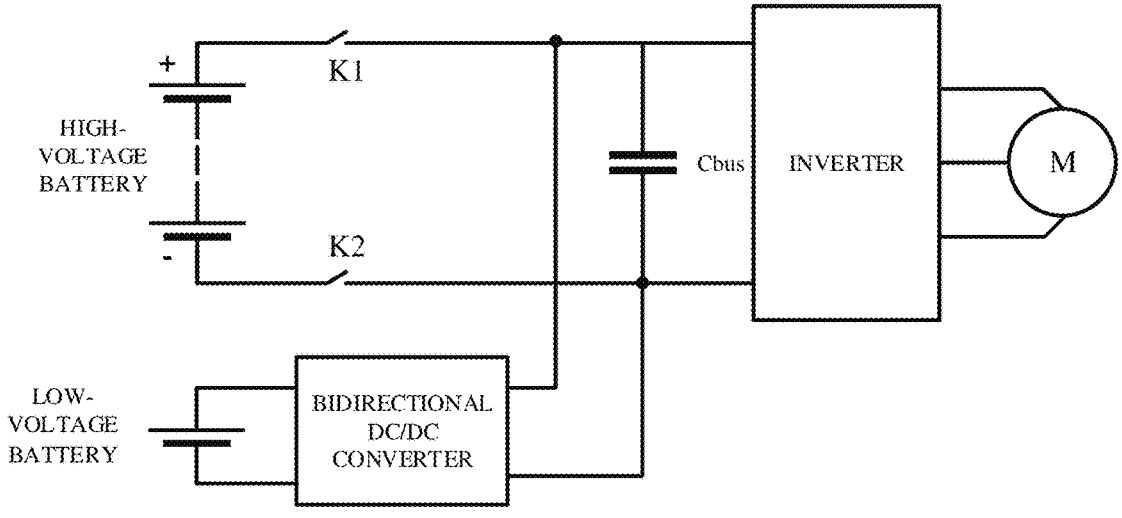
FIG. 2 is a schematic structural diagram of a pre-charge circuit in a vehicle provided in another embodiment of the disclosure.

To reduce system cost, at present, a bidirectional direct current/direct current (DC/DC) converter is used to convert the electrical energy of a low-voltage battery into high-voltage electrical energy to pre-charge a bus capacitor $C_{bus}$ in advance. Reference is made to FIG. 2, which is a schematic structural diagram of another pre-charge circuit in a vehicle provided in an embodiment of the disclosure. As illustrated in FIG. 2, a bidirectional DC/DC converter can convert the electrical energy of a low-voltage battery into high-voltage electrical energy to pre-charge a bus capacitor $C_{bus}$. A high-voltage battery in FIG. 2 may be a power battery of the vehicle. The voltage of the high-voltage battery is generally above 100V. The high-voltage battery can be used to supply power to a motor on the vehicle. The low-voltage battery may be a battery supplying power to low-voltage loads on the vehicle, and the low-voltage battery may be a storage battery of the vehicle. The voltage of the low-voltage battery is generally around 12V or around 24V, or around 48V. The low-voltage loads may include an electronic control unit (ECU) on the vehicle. The ECU may include at least one of an in-vehicle infotainment, a music player, a wiper, a steering module, and a brake module.

The bidirectional DC/DC converter can operate in a low-voltage to high-voltage mode or a high-voltage to low-voltage mode. When the bidirectional DC/DC converter operates in the low-voltage to high-voltage mode, the bidirectional DC/DC converter can convert the electrical energy of the low-voltage battery into high-voltage electrical energy to charge the bus capacitor $C_{bus}$. When the bidirectional DC/DC converter operates in the high-voltage to low-voltage mode, the bidirectional DC/DC converter can convert the electrical energy of the high-voltage battery into low-voltage electrical energy to charge the low-voltage battery.

Figure 3:
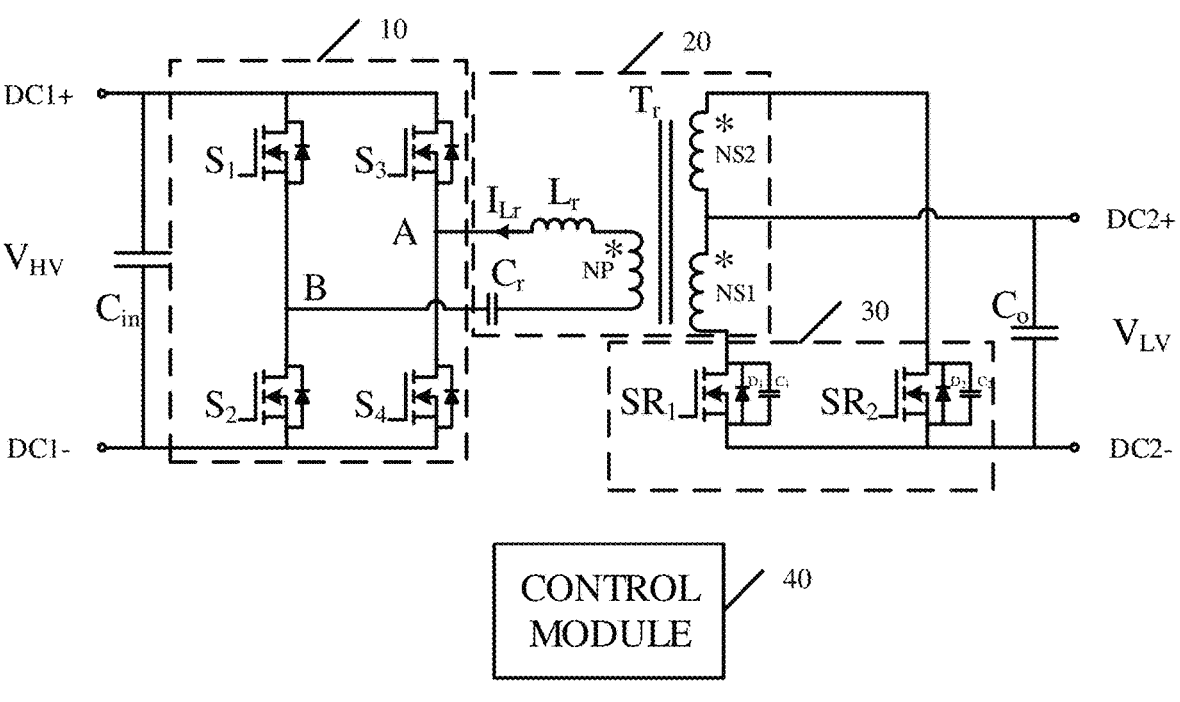
FIG. 3 is a schematic structural diagram of an energy conversion circuit provided in an embodiment of the disclosure.

Reference is made to FIG. 3, which is a schematic structural diagram of an energy conversion circuit provided in an embodiment of the disclosure. As illustrated in FIG. 3, the energy conversion circuit may include a primary bridge arm module 10, a resonant module 20, a secondary bridge arm module 30, and a control module 40. The primary bridge arm module 10 includes a first bridge arm and a second bridge arm, and the secondary bridge arm module 30 includes a first secondary switch $SR_1$ and a second secondary switch $SR_2$.

A bridge arm midpoint of the second bridge arm is connected to a first end of the resonant module 20, and a bridge arm midpoint of the first bridge arm is connected to a second end of the resonant module 20. A third end of the resonant module 20 is connected to a first terminal of the second secondary switch $SR_2$, and a fourth end of the resonant module 20 is connected to a first terminal of the first secondary switch $SR_1$. A first end of the first bridge arm is connected to a first end of the second bridge arm and a first DC positive terminal DC1+, a second end of the first bridge arm is connected to a second end of the second bridge arm and a first DC negative terminal DC1−, a fifth end of the resonant module 20 is connected to a second DC positive terminal DC2+, and a second terminal of the first secondary switch $SR_1$ is connected to a second terminal of the second secondary switch $SR_2$ and a second DC negative terminal DC2−.

A drive signal for the first bridge arm, a drive signal for the second bridge arm, a drive signal for the first secondary switch, and a drive signal for the second secondary switch are controlled by the control module 40, to increase a voltage between the first DC positive terminal DC1+ and the first DC negative terminal DC1− to a preset voltage. During an increase in the voltage between the first DC positive terminal DC1+ and the first DC negative terminal DC1−, switches in the secondary bridge arm module 30 are turned off at zero current.

As illustrated in FIG. 3, the first bridge arm includes a first switch $S_1$ and a second switch $S_2$. A first terminal of the first switch $S_1$ is connected to the first end of the first bridge arm, a second terminal of the first switch $S_1$ is connected to a first terminal of the second switch $S_2$ and the midpoint of the first bridge arm, and a second terminal of the second switch $S_2$ is connected to the second end of the first bridge arm. The driving signal for the first bridge arm includes a first driving signal and a second driving signal. The control module 40 can control a drive module to send the first driving signal to a third terminal of the first switch $S_1$, and the first driving signal is configured to control the turn-on or turn-off of the first switch $S_1$. The control module 40 can control the drive module to send the second driving signal to a third terminal of the second switch $S_2$, and the second driving signal is configured to control the turn-on or turn-off of the second switch $S_2$. The frequency of the first driving signal and the frequency of the second driving signal are the same, and the first driving signal and the second driving signal are complementary signals. That is, within one cycle of the first driving signal, one of the first switch $S_1$ and the second switch $S_2$ is turned on, and the other is turned off. Exemplarily, the duty cycles of both the first driving signal and the second driving signal are 50% (ignoring dead time).

The second bridge arm includes a third switch $S_3$ and a fourth switch $S_4$. A first terminal of the third switch $S_3$ is connected to the first end of the second bridge arm, a second terminal of the third switch $S_3$ is connected to a first terminal of the fourth switch $S_4$ and the midpoint of the second bridge arm, and a second terminal of the fourth switch $S_4$ is connected to the second end of the second bridge arm. The driving signal for the second bridge arm includes a third driving signal and a fourth driving signal. The control module 40 can control the drive module to send the third driving signal to a third terminal of the third switch $S_3$, and the third driving signal is configured to control the turn-on or turn-off of the third switch $S_3$. The control module 40 can control the drive module to send the fourth driving signal to a third terminal of the fourth switch $S_4$, and the fourth driving signal is configured to control the turn-on or turn-off of the fourth switch $S_4$. The frequency of the third driving signal and the frequency of the fourth driving signal are the same, and the third driving signal and the fourth driving signal are complementary signals. That is, within one cycle of the third driving signal, one of the third switch $S_3$ and the fourth switch $S_4$ is turned on, and the other is turned off. Exemplarily, the duty cycles of both the third driving signal and the fourth driving signal are 50% (ignoring dead time).

The control module 40 can control the drive module to send the driving signal for the first secondary switch $SR_1$ to a third terminal of the first secondary switch $SR_1$, and the driving signal for the first secondary switch SR is configured to control the turn-on or turn-off of the first secondary switch $SR_1$. The control module 40 can control the drive module to send the driving signal for the second secondary switch $SR_2$ to a third terminal of the second secondary switch $SR_2$, and the driving signal for the second secondary switch $SR_2$ is configured to control the turn-on or turn-off of the second secondary switch $SR_2$. The frequency of the driving signal for the first secondary switch $SR_1$ and the frequency of the driving signal for the second secondary switch $SR_2$ are the same, and the driving signal for the first secondary switch $SR_1$ and the driving signal for the second secondary switch $SR_2$ are complementary signals. That is, within one cycle of the driving signal for the first secondary switch $SR_1$, one of the first secondary switch SR and the second secondary switch $SR_2$ is turned on, and the other is turned off. Exemplarily, the duty cycles of both the driving signal for the first secondary switch $SR_1$ and the driving signal for the second secondary switch $SR_2$ are 50% (ignoring dead time).

Figure 6:
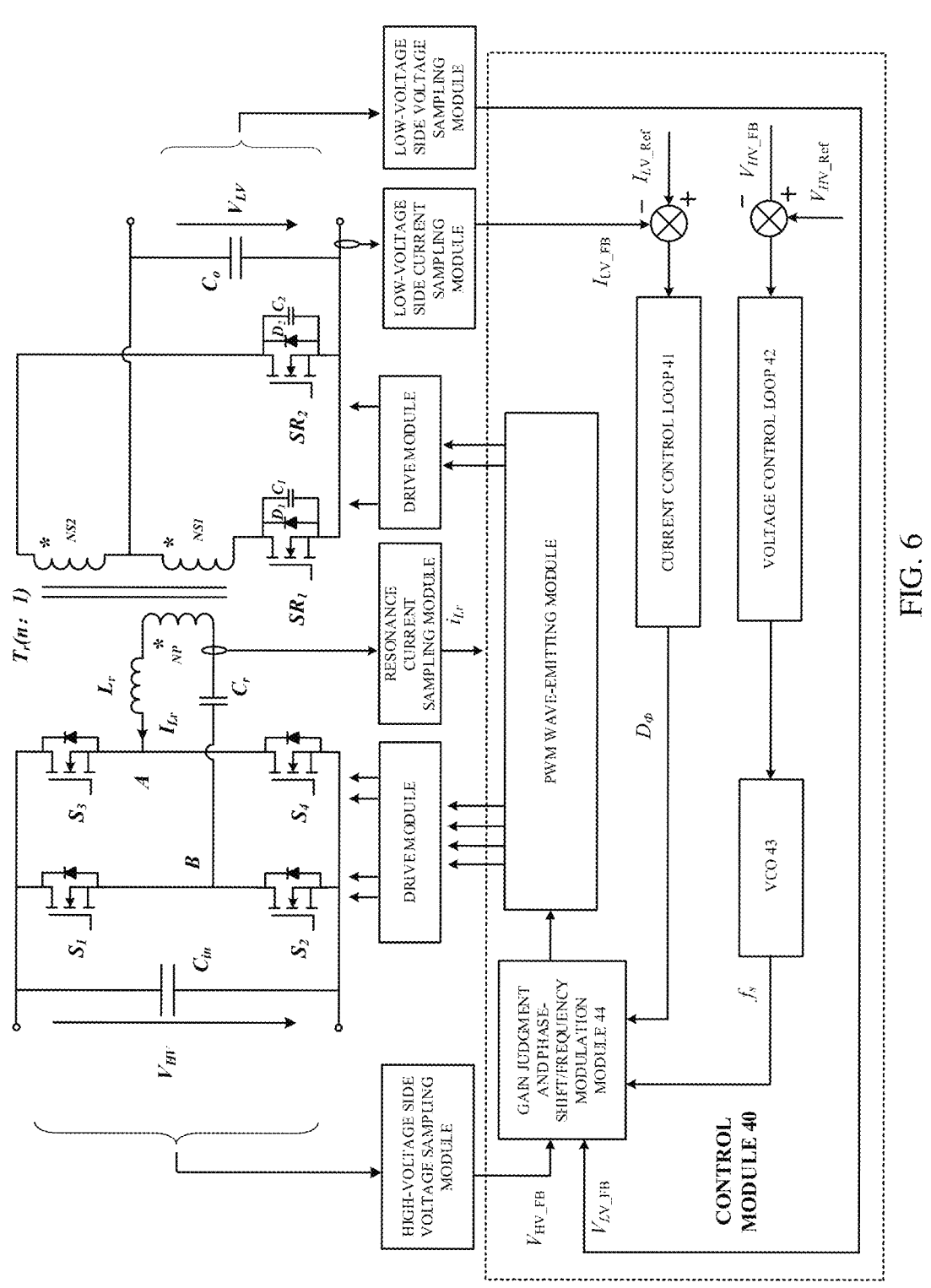
FIG. 6 is a schematic diagram of a specific control structure of an energy conversion circuit provided in an embodiment of the disclosure.

The aforementioned drive module may be a drive module in FIG. 6.

As illustrated in FIG. 3, the switches in the primary bridge arm module 10 include the first switch $S_1$, the second switch $S_2$, the third switch $S_3$, and the fourth switch $S_4$. The switches in the secondary bridge arm module 30 include the first secondary switch $SR_1$ and second secondary switch $SR_2$. Each switch may include a junction capacitor and a body diode, for example, a junction capacitor $C_1$ and a body diode $D_1$ of the first secondary switch $SR_1$, and a junction capacitor $C_2$ and a body diode $D_2$ of the second secondary switch $SR_2$.

The first switch $S_1$, the second switch $S_2$, the third switch $S_3$, the fourth switch $S_4$, the first secondary switch $SR_1$, and the second secondary switch $SR_2$ may adopt metal-oxide-semiconductor field-effect transistor (MOSFET) or insulated-gate bipolar transistor (IGBT). A MOSFET may also be referred to as a MOS tube or MOS transistor. The switches in FIG. 3 are all N-type MOS transistors for illustration, and the N-type MOS transistor may be abbreviated as NMOS transistor. The MOSFET may be a silicon carbide (SiC) MOSFET or a gallium nitride (GaN) MOSFET. A SiC MOSFET is a MOSFET using a SiC material, and a GaN MOSFET is a MOSFET using a GaN material. When a switch is a MOS transistor, a third terminal of the switch is the gate of the switch. Exemplarily, when the first switch $S_1$ is an NMOS transistor, the third terminal of the first switch $S_1$ is the gate of the first switch $S_1$.

The voltage between the first DC positive terminal DC1+ and the first DC negative terminal DC1− is $V_{HV}$. The voltage between the second DC positive terminal DC2+ and the second DC negative terminal DC2− is $V_{LV}$. The energy conversion circuit can convert the voltage $V_{LV}$ between the second DC positive terminal DC2+ and the second DC negative terminal DC2− into the voltage $V_{HV}$ between the first DC positive terminal DC1+ and the first DC negative terminal DC1−, and charge the bus capacitor $C_{bus}$.

The energy conversion circuit in FIG. 3 may be the bidirectional DC/DC converter illustrated in FIG. 2. The first DC positive terminal DC1+ and the first DC negative terminal DC1− may be respectively connected to the two terminals of the bus capacitor $C_{bus}$ in FIG. 2. $V_{LV}$ is the voltage across the low-voltage battery, and $V_{HV}$ may be the voltage across the bus capacitor $C_{bus}$.

The preset voltage may be less than or equal to the rated voltage of the bus capacitor $C_{bus}$.

In traditional control strategies for the energy conversion circuit, the switching frequency is adjusted to control the output voltage gain and the current. The energy conversion circuit operates in the inductive region, and the first secondary switch $SR_1$ and second secondary switch $SR_2$ operate in the inductive region to achieve zero voltage switch (ZVS) turn-on for the first secondary switch $SR_1$ and second secondary switch $SR_2$. Before the first secondary switch $SR_1$ is turned off, the current flows through the first secondary switch $SR_1$, and energy is transferred to the primary side through a transformer. At the instant when the first secondary switch $SR_1$ is turned off, since the current direction through the first secondary switch $SR_1$ (the current direction is: DC2+→NS1→$SR_1$→DC2−) cannot change abruptly, the current will flow through the junction capacitor $C_1$ of the first secondary switch $SR_1$ and the body diode $D_2$ of the second secondary switch $SR_2$ (the current direction at this time is: NS2→NS1→$C_1$→$D_2$), causing inductor-capacitor (LC) oscillation (L may include the parasitic inductance in the circuit and the leakage inductance of the transformer, and C may include the junction capacitor $C_1$). In addition, at the instant when the first secondary switch $SR_1$ is turned off, an excessively high resonant voltage across the junction capacitor $C_1$ of the first secondary switch $SR_1$ will be generated, bringing high voltage stress to the first secondary switch $SR_1$, thereby causing damage to the first secondary switch $SR_1$.

In embodiments of the disclosure, the energy conversion circuit can be controlled to operate in the capacitive region, which ensures that the first secondary switch $SR_1$ and second secondary switch $SR_2$ achieve zero current switch (ZCS) turn-off, solving the problem of excessively high voltage stress on the secondary switches. Due to the leading current in the resonant module 20, the current direction is switched from a forward direction (forward direction is: DC2+→NS1→$SR_1$→DC2−) to a reverse direction (reverse direction is: DC2−→$D_1$→NS1→DC2+) before the first secondary switch $SR_1$ is turned off, and the current direction keeps in the reverse direction until the second secondary switch $SR_2$ is turned on (the current direction after $SR_2$ is turned on: DC2+→NS2→$SR_2$→DC2−), completing the commutation. The first secondary switch $SR_1$ undergoes ZCS turn-off during this process. The resonant current maintains a continuous flow state, preventing LC oscillation (oscillation caused by the junction capacitor $C_1$ and the leakage inductance of the circuit), thereby avoiding excessively high voltage stress on the secondary switches.

In the energy conversion circuit of embodiments of the disclosure, the drive signal for the first bridge arm, the drive signal for the second bridge arm, the drive signal for the first secondary switch $SR_1$, and the drive signal for the second secondary switch $SR_2$ are controlled by the control module 40, to increase the voltage between the first DC positive terminal DC1+ and the first DC negative terminal DC1− to the preset voltage. During the increase in the voltage between the first DC positive terminal DC1+ and the first DC negative terminal DC1−, the switches in the secondary bridge arm module 30 are turned off at zero current. In this way, the voltage stress on the switches in the secondary bridge arm module 30 can be reduced, thereby reducing the voltage stress on the switches in the energy conversion circuit.

Optionally, as illustrated in FIG. 3, the resonant module 20 includes a resonant inductor $L_r$, a resonant capacitor $C_r$, and a transformer $T_r$. The transformer $T_r$ includes a primary winding NP, a first secondary winding NS1, and a second secondary winding NS2.

The resonant inductor $L_r$ and the resonant capacitor $C_r$ both are connected in series with the primary winding NP, and the first secondary winding NS1 is connected in series with the second secondary winding NS2. The resonant inductor $L_r$, the resonant capacitor $C_r$, and the primary winding NP are connected in series between the bridge arm midpoint (point B illustrated in FIG. 3) of the first bridge arm and the bridge arm midpoint (point A illustrated in FIG. 3) of the second bridge arm. A first end of the first secondary winding NS1 is connected to a second end of the second secondary winding NS2 and the second DC positive terminal DC2+. A second end of the first secondary winding NS1 is connected to the first terminal of the first secondary switch $SR_1$. A first end of the second secondary winding NS2 is connected to the first terminal of the second secondary switch $SR_2$.

The primary winding of the transformer $T_r$ may be integrated with a magnetizing inductance, or the magnetizing inductance may be independent from the primary winding of the transformer. In FIG. 3, the primary winding is integrated with the magnetizing inductance for description.

As illustrated in FIG. 3, a first terminal of the resonant inductor $L_r$ is connected to the bridge arm midpoint (point A illustrated in FIG. 3) of the second bridge arm, a second terminal of the resonant inductor $L_r$ is connected to a first end of the primary winding NP, a second end of the primary winding NP is connected to a first terminal of the resonant capacitor $C_r$, and a second terminal of the resonant capacitor $C_r$ is connected to the bridge arm midpoint (point B illustrated in FIG. 3) of the first bridge arm.

It may be noted that, the connection method in the resonant module 20 of FIG. 3 is one possible connection method. The resonant inductor $L_r$ and the resonant capacitor $C_r$ may be connected in series with the primary winding NP of the transformer $T_r$ in various ways. For example, after the resonant inductor $L_r$ and the resonant capacitor $C_r$ are connected in series, they may be connected between the bridge arm midpoint of the second bridge arm and the first end of the primary winding NP of the transformer $T_r$. Alternatively, after the resonant inductor $L_r$ and the resonant capacitor $C_r$ are connected in series, they may be connected between the bridge arm midpoint of the first bridge arm and the second end of the primary winding NP of the transformer $T_r$. Alternatively, the resonant capacitor $C_r$ may be connected in series between the bridge arm midpoint of the second bridge arm and the first end of the primary winding NP of the transformer $T_r$, and the resonant inductor $L_r$ may be connected in series between the bridge arm midpoint of the first bridge arm and the second end of the primary winding NP of the transformer $T_r$, which is not limited in embodiments of the disclosure.

Optionally, as illustrated in FIG. 3, the energy conversion circuit further includes a first filter capacitor $C_{in}$ and a second filter capacitor $C_o$. Two terminals of the first filter capacitor $C_{in}$ are respectively connected to the first DC positive terminal DC1+ and the first DC negative terminal DC1-. Two terminals of the second filter capacitor $C_o$ are respectively connected to the second DC positive terminal DC2+ and the second DC negative terminal DC2-.

The first filter capacitor $C_{in}$ is a primary filter capacitor, and the second filter capacitor $C_o$ is a secondary filter capacitor, both are used to absorb high-frequency ripple.

Figure 4:
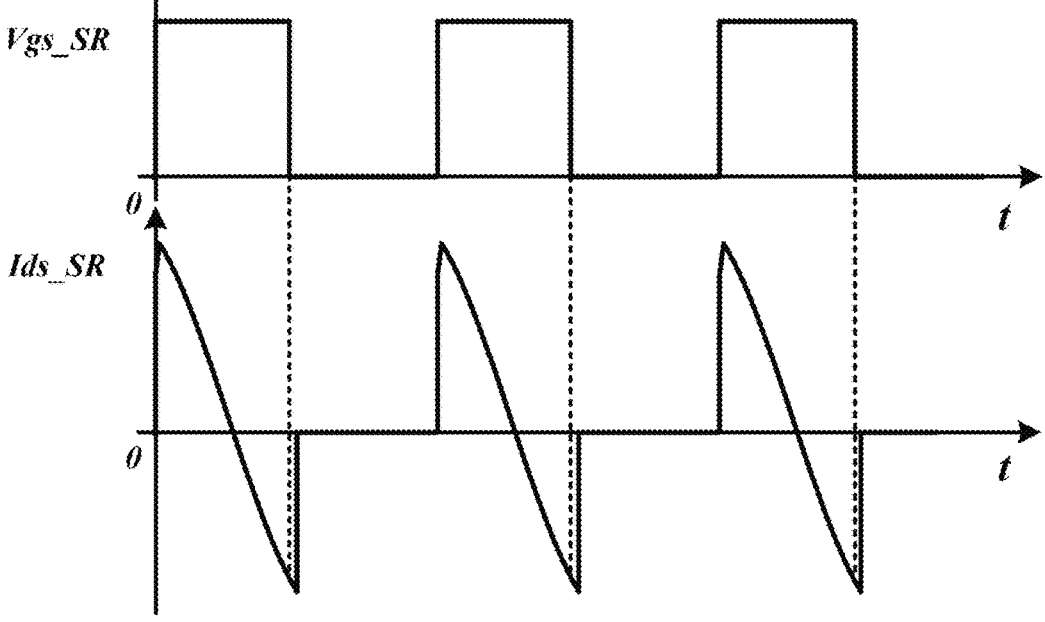
FIG. 4 is a schematic diagram of a driving signal for and a conduction current of a secondary switch provided in an embodiment of the disclosure.

When the bus capacitor $C_{bus}$ is pre-charged by the energy conversion circuit, energy of the energy conversion circuit flows from a low-voltage side to a high-voltage side. To avoid the problem of excessive stress on low-voltage side devices (switches in the secondary bridge arm module 30) during turn-off, a zero-current turn-off control method is provided in embodiments of the disclosure. Reference is made to FIG. 4, which is a schematic diagram of a driving signal for and a conduction current of a secondary switch provided in an embodiment of the disclosure. As illustrated in FIG. 4, a horizontal axis represents time t, $V_{gs\_SR}$ is a driving signal for a secondary switch, and $I_{ds\_SR}$ is a conduction current of the secondary switch. It may be seen that, at a moment when the transmission of the driving signal for the secondary switch is stopped, the conduction current of the secondary switch will flow through a body diode of the secondary switch, so that the secondary switch is turned off at zero current. In embodiments of the disclosure, safe operation of the devices is ensured without additionally providing snubber circuits, reducing system cost and improving product reliability. The aforementioned secondary switch may be the first secondary switch $SR_1$ or the second secondary switch $SR_2$ mentioned above, which will not be reiterated here.

Optionally, the drive signal for the first bridge arm, the drive signal for the second bridge arm, the drive signal for the first secondary switch $SR_1$, and the drive signal for the second secondary switch $SR_2$ being controlled by the control module 40, to increase the voltage between the first DC positive terminal DC1+ and the first DC negative terminal DC1- to the preset voltage, and during the increase in the voltage between the first DC positive terminal DC1+ and the first DC negative terminal DC1-, the switches in the secondary bridge arm module 30 being turned off at zero current, include the following.

A gain of the energy conversion circuit is determined by the control module 40 according to a first sampled voltage, a second sampled voltage, and a turns ratio of the transformer $T_r$. The first sampled voltage is a sampled voltage between the first DC positive terminal DC1+ and the first DC negative terminal DC1-, and the second sampled voltage is a sampled voltage between the second DC positive terminal DC2+ and the second DC negative terminal DC2-.

On condition that the gain of the energy conversion circuit is less than 1, the drive signal for the first bridge arm, the drive signal for the second bridge arm, the drive signal for the first secondary switch $SR_1$, and the drive signal for the second secondary switch $SR_2$ are controlled by the control module 40, to make switches in the primary bridge arm module 10 operate in a synchronous rectification mode, and to make the switches in the secondary bridge arm module 30 turned off at zero current.

On condition that the gain of the energy conversion circuit is greater than or equal to 1, a phase-shift angle of the first bridge arm relative to the first secondary switch $SR_1$ is determined by the control module 40 as a first phase-shift angle, and a phase-shift angle of the second bridge arm relative to the first secondary switch $SR_1$ is determined by the control module 40 as a second phase-shift angle, to make the switches in the primary bridge arm module 10 turned on at zero voltage and the switches in the secondary bridge arm module 30 turned off at zero current. The first phase-shift angle and the second phase-shift angle are equal, or the first phase-shift angle and the second phase-shift angle are not equal.

In embodiments of the disclosure, the switches in the primary bridge arm module 10 operate in the synchronous rectification mode, causing current to flow through the turned-on switches in the primary bridge arm module 10, rather than body diodes in the switches. This can improve rectification efficiency and reduce ripple. The switches in the secondary bridge arm module 30 are turned off at zero current, and no LC oscillation is generated, so that the voltage stress on the switches in the secondary bridge arm module 30 can be reduced, thereby reducing the voltage stress on the switches in the energy conversion circuit.

When the bus capacitor $C_{bus}$ is pre-charged by the energy conversion circuit, voltage energy at the low-voltage side is transferred to the high-voltage side to charge the bus capacitor $C_{bus}$. Since the initial voltage of a capacitor at the high-voltage side is zero, a voltage build-up process of the capacitor at the high-voltage side inevitably includes two stages: the gain being less than 1 and the gain being greater than or equal to 1. The gain is defined by an expression as follows:

$$Ge = V_{HV\_FB} / (n \times V_{LV\_FB});$$

where Ge is the gain of the energy conversion circuit, n is the turns ratio of the transformer, $V_{HV\_FB}$ is the sampled voltage between the first DC positive terminal DC1+ and the first DC negative terminal DC1−, and $V_{LV\_FB}$ is the sampled voltage between the second DC positive terminal DC2+ and the second DC negative terminal DC2−.

In embodiments of the disclosure, the energy conversion circuit can be controlled to operate in the capacitive region, so as to achieve ZCS turn-off of low-voltage side switches (first secondary switch $SR_1$ and second secondary switch $SR_2$), thereby reducing the voltage stress on the low-voltage side switches.

Figure 5:
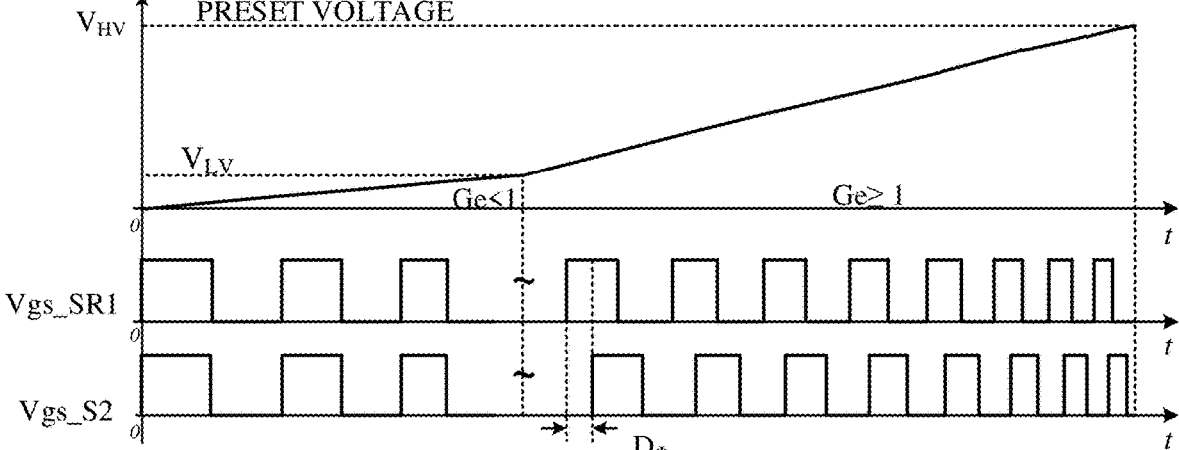
FIG. 5 is a schematic diagram of voltage change between a first direct current (DC) positive terminal DC1+ and a first DC negative terminal DC1−, a driving signal $V_{gs\_SR1}$ for a first secondary switch $SR_1$, and a driving signal $V_{gs\_S2}$ for a second switch $S_2$ in a pre-charge process provided in an embodiment of the disclosure.

Reference is made to FIG. 5, which is a schematic diagram of voltage change between a first DC positive terminal DC1+ and a first DC negative terminal DC1−, a driving signal $V_{gs\_SR1}$ for a first secondary switch $SR_1$, and a driving signal $V_{gs\_S2}$ for a second switch $S_2$ in a pre-charge process provided in an embodiment of the disclosure. As illustrated in FIG. 5, in the stage where the gain Ge of the energy conversion circuit is less than 1, the switches in the primary bridge arm module 10 operate in the synchronous rectification mode to make the switches in the secondary bridge arm module 30 turned off at zero current. At this time, the voltage $V_{HV}$ between the first DC positive terminal DC1+ and the first DC negative terminal DC1− gradually increases from 0 to $V_{LV}$ (at this point, Ge is equal to 1). In the stage where the gain Ge of the energy conversion circuit is greater than or equal to 1, in order to increase the gain, a primary-secondary side phase-shift angle $D_φ$ is introduced between the primary side and the secondary side. As Do increases, the switching frequency fs is gradually increased to ensure the gain of the energy conversion circuit and the ZCS action of the switches in the secondary bridge arm module 30. At this time, the voltage $V_{HV}$ between the first DC positive terminal DC1+ and the first DC negative terminal DC1− gradually increases from $V_{LV}$ to the preset voltage (at this point, Ge is greater than or equal to 1). As the output voltage $V_{HV}$ of the energy conversion circuit increases, the switching frequency fs also increases until the output voltage $V_{HV}$ reaches the preset voltage. When the gain Ge is equal to 1, the switching frequency fs equals a resonant frequency fr (not illustrated in FIG. 5). When the gain Ge is greater than 1, the switching frequency fs is greater than the resonant frequency fr. The resonant frequency fr is a resonant frequency of the resonant module 20.

Optionally, the drive signal for the first bridge arm, the drive signal for the second bridge arm, the drive signal for the first secondary switch $SR_1$, and the drive signal for the second secondary switch $SR_2$ being controlled by the control module 40, to make the switches in the primary bridge arm module 10 operate in the synchronous rectification mode, and to make the switches in the secondary bridge arm module 30 turned off at zero current, includes the following.

Loop calculation is performed by the control module 40 according to the first sampled voltage to obtain a voltage loop calculation result, and a signal frequency is determined by the control module according to the voltage loop calculation result.

A frequency of the drive signal for the first bridge arm, a frequency of the drive signal for the second bridge arm, a frequency of the drive signal for the first secondary switch $SR_1$, and a frequency of the drive signal for the second secondary switch $SR_2$ all are determined by the control module 40 as the signal frequency, to make the switches in the primary bridge arm module 10 operate in the synchronous rectification mode, and to make the switches in the secondary bridge arm module 30 turned off at zero current.

In embodiments of the disclosure, in the stage where the gain Ge of the energy conversion circuit is less than 1, the switches in the primary bridge arm module 10 operate in the synchronous rectification mode, and the switches in the secondary bridge arm module 30 are turned off at zero current.

In the stage where the gain Ge of the energy conversion circuit is less than 1, the input voltage and the output voltage are sampled for real-time gain calculation. The calculated result is then converted into the required switching frequency through a voltage controlled oscillator (VCO). Finally, the driving signals are allocated by a wave-emitting module.

Optionally, the phase-shift angle of the first bridge arm relative to the first secondary switch $SR_1$ being determined by the control module 40 as the first phase-shift angle, and the phase-shift angle of the second bridge arm relative to the first secondary switch $SR_1$ being determined by the control module 40 as the second phase-shift angle, to make the switches in the primary bridge arm module 10 turned on at zero voltage and the switches in the secondary bridge arm module 30 turned off at zero current, includes the following.

A primary-secondary side phase-shift angle is determined by the control module 40 according to a sampled current and a reference current.

On condition that the first phase-shift angle and the second phase-shift angle are equal, the primary-secondary side phase-shift angle is determined by the control module 40 as the first phase-shift angle.

On condition that the first phase-shift angle and the second phase-shift angle are not equal, according to the primary-secondary side phase-shift angle and the gain of the energy conversion circuit, the phase-shift angle of the first bridge arm relative to the first secondary switch SR is determined by the control module 40 as the first phase-shift angle, and the phase-shift angle of the second bridge arm relative to the first secondary switch $SR_1$ is determined by the control module 40 as the second phase-shift angle, to make the switches in the primary bridge arm module 10 turned on at zero voltage and the switches in the secondary bridge arm module 30 turned off at zero current. The sampled current is a sampled current between the second terminal of the first secondary switch $SR_1$ and the second DC negative terminal DC2−.

In embodiments of the disclosure, in the stage where the gain Ge of the energy conversion circuit is greater than 1, in order to limit the current on the low-voltage side, a constant-current control phase is entered. Closed-loop control is performed on the primary-secondary side phase-shift angle Do through the current control loop, while open-loop adjustment of the switching frequency is performed according to the real-time calculated gain.

Reference is made to FIG. 6, which is a schematic diagram of a specific control structure of an energy conversion circuit provided in an embodiment of the disclosure. As illustrated in FIG. 6, the control module 40 includes a current control loop 41, a voltage control loop 42, a VCO 43, a gain judgment and phase-shift/frequency modulation module 44, and a pulse width modulation (PWM) wave-emitting module.

The VCO 43 is configured to calculate a signal frequency according to the voltage loop calculation result.

The gain judgment and phase-shift/frequency modulation module 44 is configured to calculate the gain of the energy conversion circuit according to the first sampled voltage and the second sampled voltage.

The gain judgment and phase-shift/frequency modulation module 44 is further configured to, on condition that the gain of the energy conversion circuit is less than 1, determine a frequency of the drive signal of the first bridge arm, a frequency of the drive signal of the second bridge arm, a frequency of the drive signal of the first secondary switch, and a frequency of the drive signal of the second secondary switch all as the signal frequency.

The gain judgment and phase-shift/frequency modulation module 44 is further configured to, on condition that the gain of the energy conversion circuit is greater than or equal to 1, determine both the first phase-shift angle and the second phase-shift angle as the primary-secondary side phase-shift angle, or calculate the first phase-shift angle and the second phase-shift angle according to the gain of the energy conversion circuit and the primary-secondary side phase-shift angle.

The current control loop 41 is configured to perform loop calculation on a result of a subtraction operation between the sampled current ($I_{LV\_FB}$ illustrated in FIG. 6) and the reference current ($I_{LV\_Ref}$ illustrated in FIG. 6), and output a primary-secondary side phase-shift angle Do. The reference current $I_{LV\_Ref}$ is a required current currently set on the low-voltage side of the energy conversion circuit, and the sampling current $I_{LV\_FB}$ is obtained by sampling through a low-voltage side current sampling module in FIG. 6. The low-voltage side current sampling module is configured to sample the current between the second end of the first secondary switch $SR_1$ and the second DC negative terminal DC2−. The current between the second end of the first secondary switch $SR_1$ and the second DC negative terminal DC2− may be a filtered current (for example, the sampled current $I_{LV\_FB}$ is a current filtered by the second filtering capacitor $C_o$ in FIG. 6). The current control loop 41 is used in the stage where the gain is greater than or equal to 1.

The voltage control loop 42 is configured to perform loop calculation on a result of a subtraction operation between the first sampled voltage ($V_{HV\_FB}$ illustrated in FIG. 6) and a reference voltage ($V_{HV}$ Ref illustrated in FIG. 6), and output a voltage loop calculation result. The first sampling voltage $V_{HV\_FB}$ is a sampling voltage between the first DC positive terminal DC1+ and the first DC negative terminal DC1−. The first sampling voltage $V_{HV\_FB}$ is obtained by sampling through a high-voltage side voltage sampling module in FIG. 6. The high-voltage side voltage sampling module is configured to sample the voltage between the first DC positive terminal DC1+ and the first DC negative terminal DC1−. The voltage control loop 42 is used in the stage where the gain is less than 1.

The VCO 43 is configured to calculate a signal frequency according to the voltage loop calculation result.

The gain judgment and phase-shift/frequency modulation module 44 is configured to calculate the gain of the energy conversion circuit according to the first sampled voltage ($V_{HV\_FB}$ illustrated in FIG. 6) and the second sampled voltage ($V_{LV\_FB}$ illustrated in FIG. 6).

The gain judgment and phase-shift/frequency modulation module 44 is further configured to, on condition that the gain of the energy conversion circuit is less than 1, determine a frequency of the drive signal of the first bridge arm, a frequency of the drive signal of the second bridge arm, a frequency of the drive signal of the first secondary switch $SR_1$, and a frequency of the drive signal of the second secondary switch $SR_2$ all as the signal frequency.

The gain judgment and phase-shift/frequency modulation module 44 is further configured to, on condition that the gain of the energy conversion circuit is greater than or equal to 1, determine both the first phase-shift angle and the second phase-shift angle as the primary-secondary side phase-shift angle, or calculate the first phase-shift angle and the second phase-shift angle according to the gain of the energy conversion circuit and the primary-secondary side phase-shift angle. The signal frequency may be referred to as the switching frequency fs.

The PWM wave-emitting module is a PWM module. The PWM wave-emitting module can generate a wave-emitting signal for each switch based on the gain of the energy conversion circuit output by the gain judgment and phase shift/frequency modulation module, as well as the signal frequency fs or the phase shift angle. The drive module amplifies and isolates the wave-emitting signal for each switch to generate the driving signal for each switch. The driving signal for the switch is configured to turn on or turn off the switch.

Figure 7:
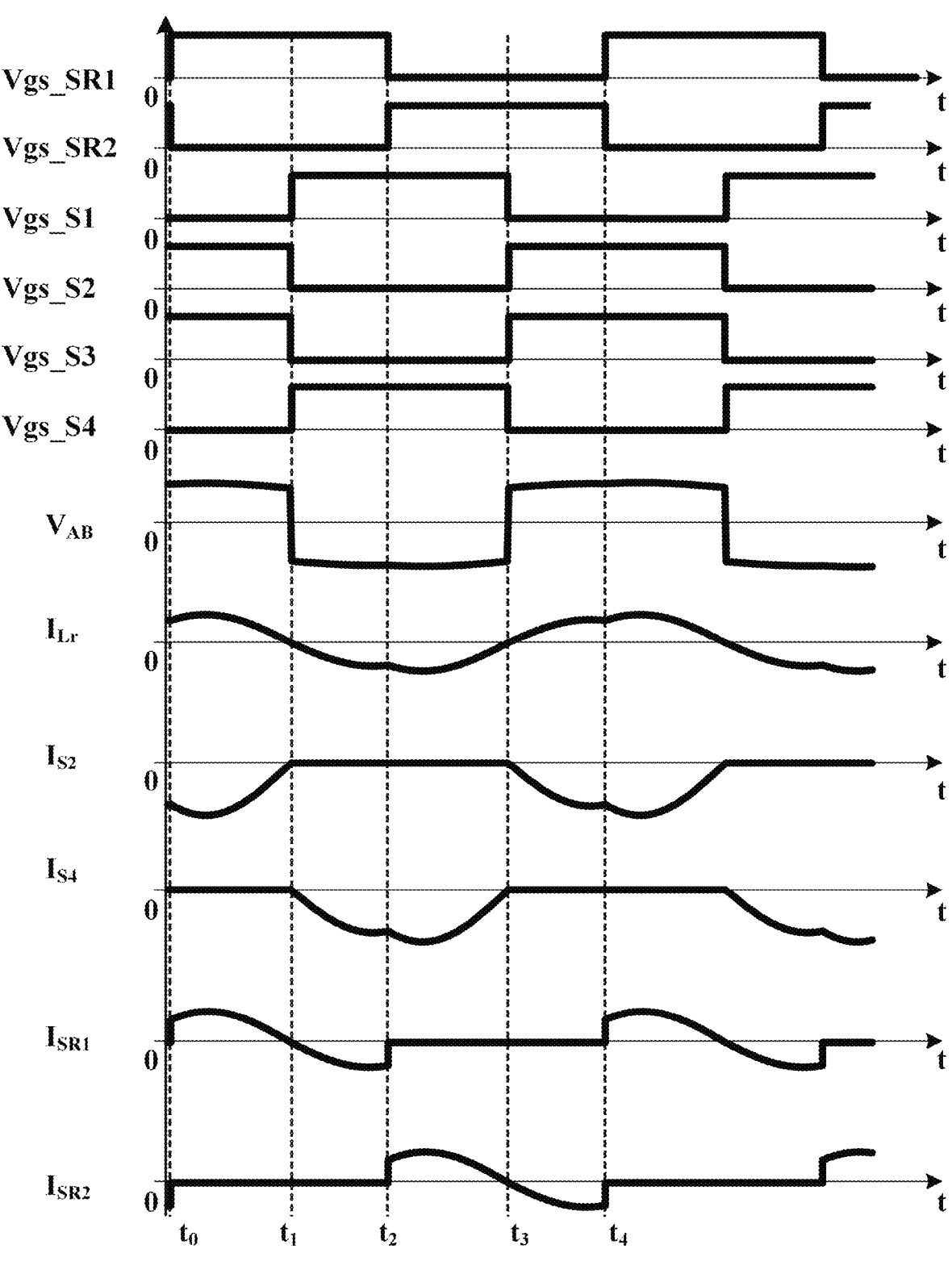
FIG. 7 is a schematic waveform diagram of driving signals for various switches, resonant current, and currents of high/low-voltage side switches when Ge is less than 1 provided in an embodiment of the disclosure.
Figure 8:
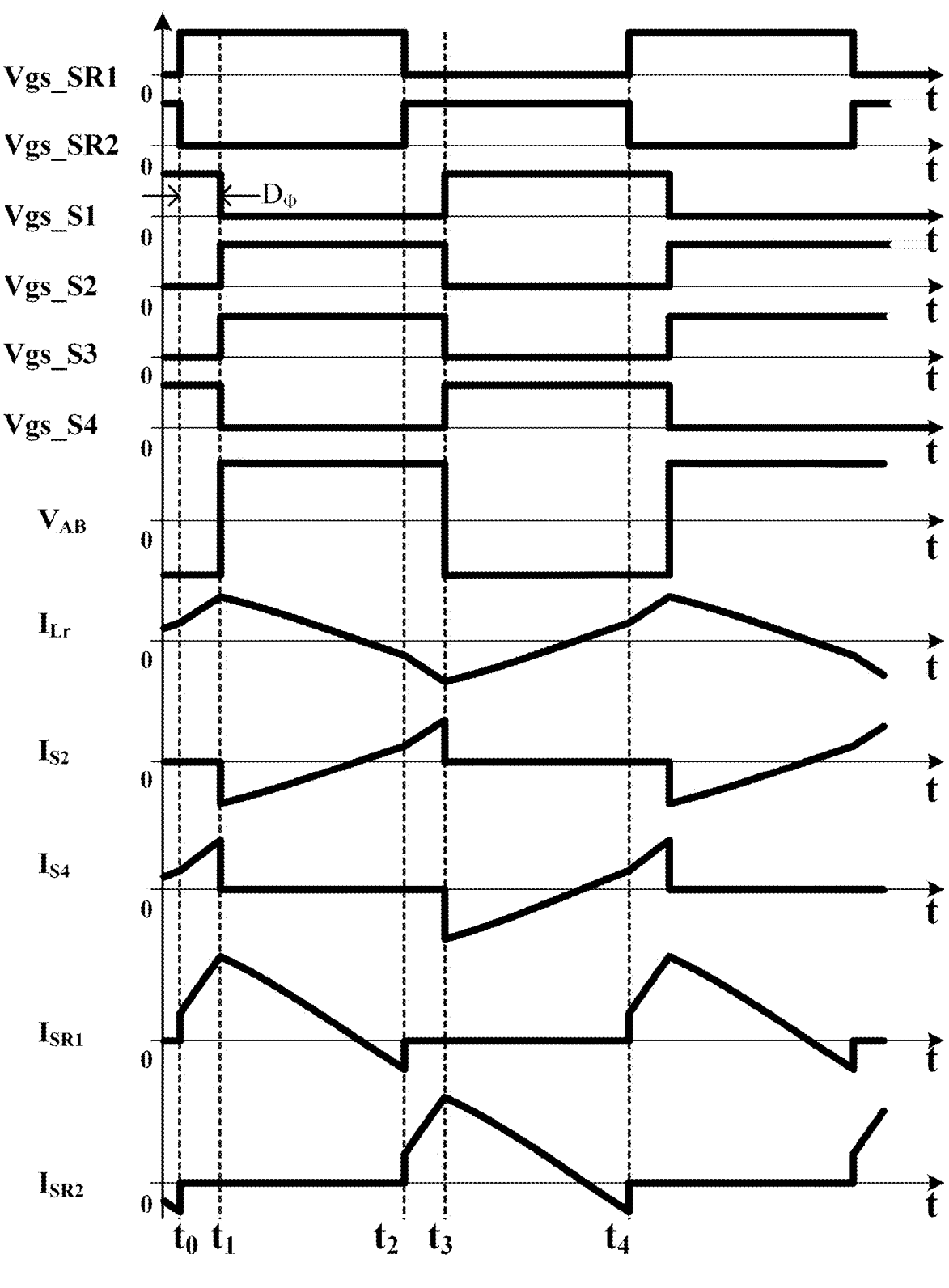
FIG. 8 is a schematic waveform diagram of driving signals for various switches, resonant current, and currents of high/low-voltage side switches when Ge is greater than or equal to 1 provided in an embodiment of the disclosure.
Figure 9:
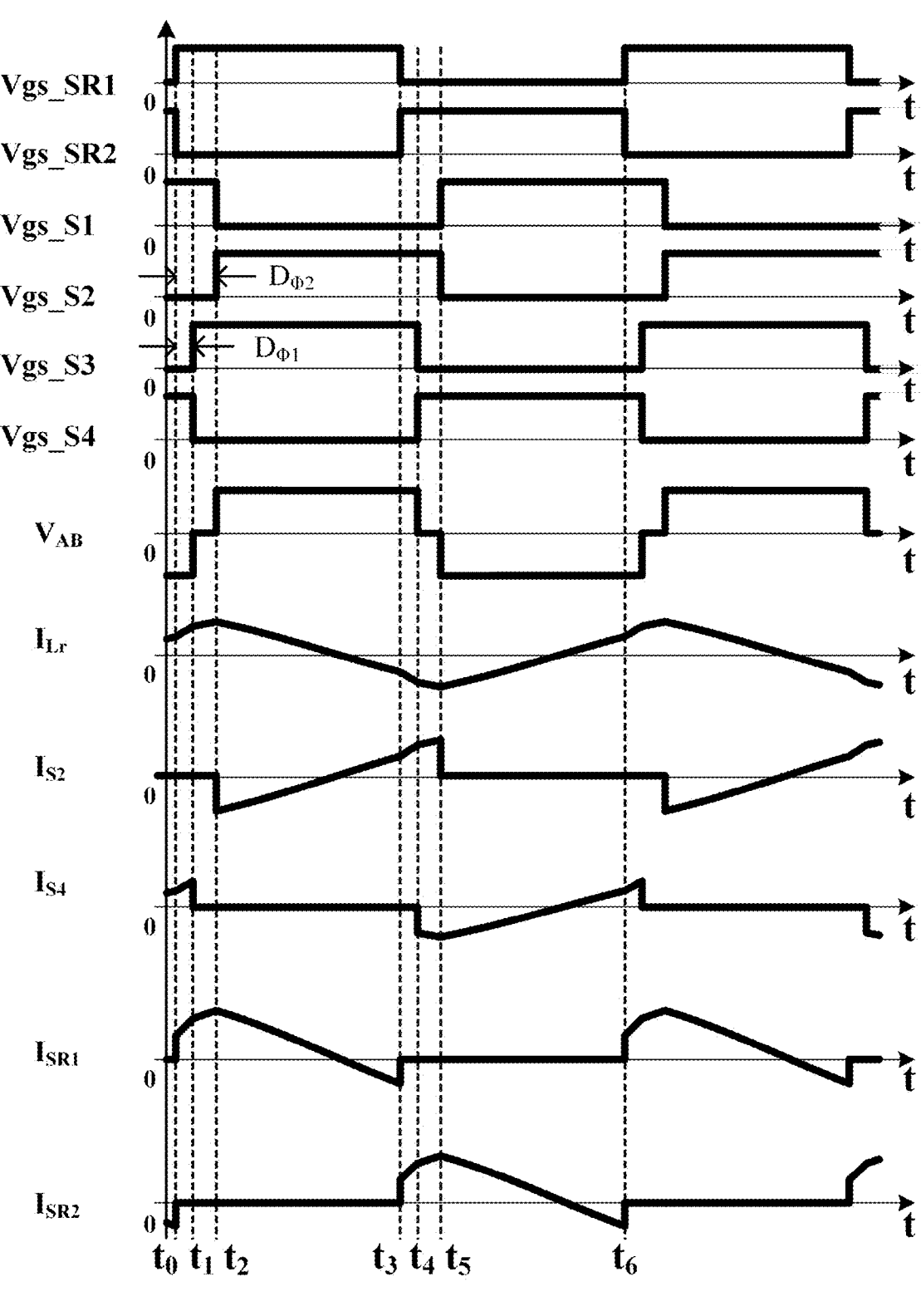
FIG. 9 is another schematic waveform diagram of driving signals for various switches, resonant current, and currents of high/low-voltage side switches when Ge is greater than or equal to 1 provided in an embodiment of the disclosure.

To explain the control strategies in the two stages (Ge being less than 1 and Ge being greater than or equal to 1) in more detail, typical control sequences and waveforms for Ge being less than 1 and Ge being greater than 1 are provided in the following. Reference is made to FIG. 7, which is a schematic waveform diagram of driving signals for various switches, resonant current, and currents of high/low-voltage side switches when Ge is less than 1 provided in an embodiment of the disclosure. Reference is made to FIG. 8, which is a schematic waveform diagram of driving signals for various switches, resonant current, and currents of high/low-voltage side switches when Ge is greater than or equal to 1 provided in an embodiment of the disclosure. Reference is made to FIG. 9, which is another schematic waveform diagram of driving signals for various switches, resonant current, and currents of high/low-voltage side switches when Ge is greater than or equal to 1 provided in an embodiment of the disclosure.

$V_{gs\_SR1}$ is the driving signal for the first secondary switch $SR_1$. $V_{gs\_SR2}$ is the driving signal for the second secondary switch $SR_2$. $V_{gs\_S1}$ is the driving signal for the first switch $S_1$. $V_{gs\_S2}$ is the driving signal for the second switch $S_2$. $V_{gs\_S3}$ is the driving signal for the third switch $S_3$. $V_{gs\_S4}$ is the driving signal for the fourth switch $S_4$. $V_{AB}$ is the voltage between the bridge arm midpoint of the second bridge arm and the bridge arm midpoint of the first bridge arm. $I_{Lr}$ is the resonant current in the resonant module 20 (as illustrated in FIG. 6, $I_{Lr}$ is the current on the resonant inductor $L_r$). $I_{S2}$ is the current of the second switch $S_2$. $I_{S4}$ is the current of the fourth switch $S_4$. $I_{SR1}$ is the current of the first secondary switch $SR_1$. $I_{SR2}$ is the current of the second secondary switch $SR_2$.

When Ge is less than 1, as illustrated in FIG. 7, switches in the high-voltage side operate in the synchronous rectification mode. Moment $t_2$ corresponds to the turn-off moment of the first secondary switch $SR_1$, and a corresponding current waveform of $I_{SR1}$ represents ZCS turn-off. Moment $t_4$ corresponds to the turn-off moment of the second secondary switch $SR_2$, and a corresponding current waveform of $I_{SR2}$ represents ZCS turn-off.

When Ge is greater than or equal to 1, there are two control methods. The first one is illustrated in FIG. 8. In this case, the first phase-shift angle and the second phase-shift angle are equal. After calculating the primary-secondary side phase-shift angle $D_\Phi$ (i.e., the phase-shift angle between a primary drive and a secondary drive), both the first phase-shift angle and the second phase-shift angle are equal to the primary-secondary side phase-shift angle $D_\Phi$. Moment t0 corresponds to the ZCS turn-off of the second secondary switch $SR_2$. Moment $t_1$ corresponds to the ZVS turn-on of the second switch $S_2$. Moment $t_2$ corresponds to the ZCS turn-off of the first secondary switch $SR_1$. Moment $t_3$ corresponds to the ZVS turn-on of the fourth switch $S_4$. The second one is illustrated in FIG. 9. In this case, the first phase-shift angle and the second phase-shift angle are not equal, by introducing phase-shift control between the high-voltage side bridge arms (first bridge arm and second bridge arm). $D_{\Phi 1}$ and $D_{\Phi 2}$ illustrated in FIG. 9 correspond to the first phase-shift angle and the second phase-shift angle respectively. Moment t0 corresponds to the ZCS turn-off of the second secondary switch $SR_2$. Moment $t_2$ corresponds to the ZVS turn-on of the second switch $S_2$. Moment $t_3$ corresponds to the ZCS turn-off of the first secondary switch $SR_1$. Moment $t_4$ corresponds to the ZVS turn-on of the fourth switch $S_4$. Through the above two control methods, ZVS turn-on of the switches in the primary bridge arm module 10 and ZCS turn-off of the switches in the secondary bridge arm module 30 can be achieved.

Optionally, on condition that the gain of the energy conversion circuit is greater than or equal to 1, and the first phase-shift angle and the second phase-shift angle are not equal, the first phase-shift angle and the second phase-shift angle are determined according to the following formulas:

$$D_{\Phi 1} = D_\alpha - (1 - D_{y1});$$

$$D_{\Phi 2} = D_\alpha;$$

$$D_\alpha = (-D_{y1} + 2D_\Phi)/2;$$

$$\text{if } D_\Phi < D_{\Phi B}, \text{ then } D_{y1} = k \times (2D_\Phi + 1)/(2 - k);$$

$$\text{if } D_\Phi \geq D_{\Phi B}, \text{ then } D_{y1} = [2 \times D_\Phi \times (1 - k) + 2k - 1]/k;$$

$$\text{where } k = 1/Ge; D_{\Phi B} = (1 - k)/2; Ge = V_{HV\_FB}/(n \times V_{LV\_FB});$$

Ge is the gain of the energy conversion circuit, $D_\Phi$ is the primary-secondary side phase-shift angle from loop calculation, $D_{\Phi 1}$ is the first phase-shift angle, $D_{\Phi 2}$ is the second phase-shift angle, n is the turns ratio of the transformer, $V_{HV\_FB}$ is the first sampled voltage, $V_{LV\_FB}$ is the second sampled voltage.

Optionally, the signal frequency is positively correlated to the gain of the energy conversion circuit. As illustrated in FIG. 5, the signal frequency (switching frequency fs) increases as the gain Ge of the energy conversion circuit increases.

The energy conversion circuits illustrated in FIG. 3 and FIG. 6 can operate in the capacitive region.

Based on the energy conversion circuits illustrated in FIG. 3 and FIG. 6, a control method based on the energy conversion circuit is provided in embodiments of the disclosure. Reference is made to FIG. 10, which is a schematic flowchart of a control method based on an energy conversion circuit provided in an embodiment of the disclosure. As illustrated in FIG. 10, the control method based on the energy conversion circuit includes the following operation.

At 1001, the drive signal for the first bridge arm, the drive signal for the second bridge arm, the drive signal for the first secondary switch, and the drive signal for the second secondary switch are controlled by the control module, to increase the voltage between the first DC positive terminal and the first DC negative terminal to the preset voltage. During the increase of the voltage between the first DC positive terminal and the first DC negative terminal, the switches in the secondary bridge arm module are turned off at zero current.

The operation at 1001 can be executed by the current control loop 41, the voltage control loop 42, the VCO 43, the gain judgment and phase-shift/frequency modulation module 44 included in the control module 40 of the energy conversion circuit illustrated in FIG. 6.

In the control method based on the energy conversion circuit provided in embodiments of the disclosure, the adjustment of pre-charge voltage and the control of voltage stress on low-voltage side devices are achieved without adding additional lines, which has the characteristics of saving system cost and flexible control.

Reference is made to FIG. 11, which is a schematic structural view of a vehicle 1 provided in an embodiment of the disclosure. As illustrated in FIG. 11, the vehicle 1 can include an energy conversion circuit 100 and a bus capacitor $C_{bus}$. The energy conversion circuit 100 is configured to convert the DC in the low-voltage side into the DC in the high-voltage side to charge the bus capacitor $C_{bus}$.

The specific structure and operating principle of the energy conversion circuit 100 in FIG. 11 can be referred to the embodiments illustrated in above FIG. 1 to FIG. 6, which will not be repeated here.

In the above embodiments, the description of each embodiment has respective focuses. For a part that is not described in detail in an embodiment, refer to related descriptions in other embodiments.

In the several embodiments provided in the disclosure, it may be understood that the disclosed energy conversion circuit, the control method based on the energy conversion circuit, and the vehicle may be implemented in other manners. For example, the embodiments of the energy conversion circuit described above are merely exemplary. For example, the unit division is merely logical function division and may be other division in actual implementation. For example, multiple units or components may be combined or may be integrated into another system, or some features may be ignored or not executed.

What is claimed is:

1. An energy conversion circuit, comprising a primary bridge arm module, a resonant module, a secondary bridge arm module, and a control module; wherein the primary bridge arm module comprises a first bridge arm and a second bridge arm, and the secondary bridge arm module comprises a first secondary switch and a second secondary switch;

a bridge arm midpoint of the second bridge arm is connected to a first end of the resonant module, and a bridge arm midpoint of the first bridge arm is connected to a second end of the resonant module; a third end of the resonant module is connected to a first terminal of the second secondary switch, and a fourth end of the resonant module is connected to a first terminal of the first secondary switch; a first end of the first bridge arm is connected to a first end of the second bridge arm and a first direct current (DC) positive terminal, a second end of the first bridge arm is connected to a second end of the second bridge arm and a first DC negative terminal, a fifth end of the resonant module is connected to a second DC positive terminal, and a second terminal of the first secondary switch is connected to a second terminal of the second secondary switch and a second DC negative terminal; and a drive signal for the first bridge arm, a drive signal for the second bridge arm, a drive signal for the first secondary switch, and a drive signal for the second secondary switch are controlled by the control module, to increase a voltage between the first DC positive terminal and the first DC negative terminal to a preset voltage; wherein during an increase in the voltage between the first DC positive terminal and the first DC negative terminal, switches in the secondary bridge arm module are turned off at zero current;

wherein the resonant module comprises a resonant inductor, a resonant capacitor, and a transformer; the transformer comprises a primary winding, a first secondary winding, and a second secondary winding;

the resonant inductor and the resonant capacitor both are connected in series with the primary winding, and the first secondary winding is connected in series with the second secondary winding; the resonant inductor, the resonant capacitor, and the primary winding are connected in series between the bridge arm midpoint of the first bridge arm and the bridge arm midpoint of the second bridge arm, a first end of the first secondary winding is connected to a second end of the second secondary winding and the second DC positive terminal, a second end of the first secondary winding is connected to the first terminal of the first secondary switch, and a first end of the second secondary winding is connected to the first terminal of the second secondary switch;

wherein the drive signal for the first bridge arm, the drive signal for the second bridge arm, the drive signal for the first secondary switch, and the drive signal for the second secondary switch being controlled by the control module, to increase the voltage between the first DC positive terminal and the first DC negative terminal to the preset voltage, and during the increase in the voltage between the first DC positive terminal and the first DC negative terminal, the switches in the secondary bridge arm module being turned off at zero current, comprise:

a gain of the energy conversion circuit being determined by the control module according to a first sampled voltage, a second sampled voltage, and a turns ratio of the transformer; the first sampled voltage being a sampled voltage between the first DC positive terminal and the first DC negative terminal, and the second sampled voltage being a sampled voltage between the second DC positive terminal and the second DC negative terminal;

on condition that the gain of the energy conversion circuit is less than 1, the drive signal for the first bridge arm, the drive signal for the second bridge arm, the drive signal for the first secondary switch, and the drive signal for the second secondary switch being controlled by the control module, to make switches in the primary bridge arm module operate in a synchronous rectification mode, and to make the switches in the secondary bridge arm module turned off at zero current; and on condition that the gain of the energy conversion circuit is greater than or equal to 1, a phase-shift angle of the first bridge arm relative to the first secondary switch being determined by the control module as a first phase-shift angle, and a phase-shift angle of the second bridge arm relative to the first secondary switch being determined by the control module as a second phase-shift angle, to make the switches in the primary bridge arm module turned on at zero voltage and the switches in the secondary bridge arm module turned off at zero current, wherein the first phase-shift angle and the second phase-shift angle being equal, or the first phase-shift angle and the second phase-shift angle being not equal.

2. The energy conversion circuit of claim 1, wherein the drive signal for the first bridge arm, the drive signal for the second bridge arm, the drive signal for the first secondary switch, and the drive signal for the second secondary switch being controlled by the control module, to make the switches in the primary bridge arm module operate in the synchronous rectification mode, and to make the switches in the secondary bridge arm module turned off at zero current, comprises:

loop calculation being performed by the control module according to the first sampled voltage to obtain a voltage loop calculation result, and a signal frequency being determined by the control module according to the voltage loop calculation result; and a frequency of the drive signal for the first bridge arm, a frequency of the drive signal for the second bridge arm, a frequency of the drive signal for the first secondary switch, and a frequency of the drive signal for the second secondary switch all being determined by the control module as the signal frequency, to make the switches in the primary bridge arm module operate in the synchronous rectification mode, and to make the switches in the secondary bridge arm module turned off at zero current.

3. The energy conversion circuit of claim 1, wherein the phase-shift angle of the first bridge arm relative to the first secondary switch being determined by the control module as the first phase-shift angle, and the phase-shift angle of the second bridge arm relative to the first secondary switch being determined by the control module as the second phase-shift angle, to make the switches in the primary bridge arm module turned on at zero voltage and the switches in the secondary bridge arm module turned off at zero current, comprises:

a primary-secondary side phase-shift angle being determined by the control module according to a sampled current and a reference current;

on condition that the first phase-shift angle and the second phase-shift angle are equal, the primary-secondary side phase-shift angle being determined as the first phase-shift angle;

on condition that the first phase-shift angle and the second phase-shift angle are not equal, according to the primary-secondary side phase-shift angle and the gain of the energy conversion circuit, the phase-shift angle of the first bridge arm relative to the first secondary switch being determined by the control module as the first phase-shift angle, and the phase-shift angle of the second bridge arm relative to the first secondary switch being determined by the control module as the second phase-shift angle, to make the switches in the primary bridge arm module turned on at zero voltage and the switches in the secondary bridge arm module turned off at zero current, wherein the sampled current being a sampled current between the second terminal of the first secondary switch and the second DC negative terminal.

4. The energy conversion circuit of claim 1, wherein the control module comprises a current control loop, a voltage control loop, a voltage-controlled oscillator (VCO), and a gain judgment and phase-shift/frequency modulation module;

the current control loop is configured to perform loop calculation on a result of a subtraction operation between the sampled current and the reference current, and output a primary-secondary side phase-shift angle;

the voltage control loop is configured to perform loop calculation on a result of a subtraction operation between the first sampled voltage and a reference voltage, and output a voltage loop calculation result;

the VCO is configured to calculate a signal frequency according to the voltage loop calculation result;

the gain judgment and phase-shift/frequency modulation module is configured to calculate the gain of the energy conversion circuit according to the first sampled voltage and the second sampled voltage;

the gain judgment and phase-shift/frequency modulation module is further configured to, on condition that the gain of the energy conversion circuit is less than 1, determine a frequency of the drive signal of the first bridge arm, a frequency of the drive signal of the second bridge arm, a frequency of the drive signal of the first secondary switch, and a frequency of the drive signal of the second secondary switch all as the signal frequency; and the gain judgment and phase-shift/frequency modulation module is further configured to, on condition that the gain of the energy conversion circuit is greater than or equal to 1, determine both the first phase-shift angle and the second phase-shift angle as the primary-secondary side phase-shift angle, or calculate the first phase-shift angle and the second phase-shift angle according to the gain of the energy conversion circuit and the primary-secondary side phase-shift angle.

5. The energy conversion circuit of claim 1, wherein on condition that the gain of the energy conversion circuit is greater than or equal to 1, and the first phase-shift angle and the second phase-shift angle are not equal, the first phase-shift angle and the second phase-shift angle are determined according to the following formulas:

$$D_{\Phi 1} = D_\alpha - (1 - D_{y1});$$

20

$$D_{\Phi 2} = D_\alpha;$$

$$D_\alpha = (1 - D_{y1} + 2D_\Phi)/2;$$

if $D_\Phi < D_{\Phi B}$, then $D_{y1} = k \times (2D_\Phi + 1)/(2 - k);$ if $D_\Phi \geq D_{\Phi B}$, then $D_{y1} = [2 \times D_\Phi \times (1 - k) + 2k - 1]/k;$ wherein $k = 1/Ge$; $D_{\Phi B} = (1 - k)/2$; $Ge = V_{HV\_FB}/(n \times V_{LV\_FB});$ Ge is the gain of the energy conversion circuit, $D_\Phi$ is the primary-secondary side phase-shift angle from loop calculation, $D_{\Phi 1}$ is the first phase-shift angle, $D_{\Phi 2}$ is the second phase-shift angle, n is the turns ratio of the transformer, $V_{HV\_FB}$ is the first sampled voltage, $V_{LV\_FB}$ is the second sampled voltage.

6. The energy conversion circuit of claim 1, wherein the signal frequency is positively correlated to the gain of the energy conversion circuit.

7. A control method based on an energy conversion circuit, wherein the control method is applied to the energy conversion circuit of claim 1, and the control method comprises:

controlling, by the control module, the drive signal for the first bridge arm, the drive signal for the second bridge arm, the drive signal for the first secondary switch, and the drive signal for the second secondary switch, to increase the voltage between the first DC positive terminal and the first DC negative terminal to the preset voltage;

wherein during the increase of the voltage between the first DC positive terminal and the first DC negative terminal, the switches in the secondary bridge arm module are turned off at zero current.

8. A vehicle, comprising an energy conversion circuit and a bus capacitor, two terminals of the bus capacitor are respectively connected to the first DC positive terminal and the first DC negative terminal of the energy conversion circuit, and the energy conversion circuit is configured to charge the bus capacitor;

wherein the energy conversion circuit comprises a primary bridge arm module, a resonant module, a secondary bridge arm module, and a control module; wherein the primary bridge arm module comprises a first bridge arm and a second bridge arm, and the secondary bridge arm module comprises a first secondary switch and a second secondary switch;

a bridge arm midpoint of the second bridge arm is connected to a first end of the resonant module, and a bridge arm midpoint of the first bridge arm is connected to a second end of the resonant module; a third end of the resonant module is connected to a first terminal of the second secondary switch, and a fourth end of the resonant module is connected to a first terminal of the first secondary switch; a first end of the first bridge arm is connected to a first end of the second bridge arm and a first direct current (DC) positive terminal, a second end of the first bridge arm is connected to a second end of the second bridge arm and a first DC negative terminal, a fifth end of the resonant module is connected to a second DC positive terminal, and a second terminal of the first secondary switch is connected to a second terminal of the second secondary switch and a second DC negative terminal; and a drive signal for the first bridge arm, a drive signal for the second bridge arm, a drive signal for the first secondary switch, and a drive signal for the second secondary switch are controlled by the control module, to increase a voltage between the first DC positive terminal and the first DC negative terminal to a preset voltage; wherein during an increase in the voltage between the first DC positive terminal and the first DC negative terminal, switches in the secondary bridge arm module are turned off at zero current;

wherein the resonant module comprises a resonant inductor, a resonant capacitor, and a transformer; the transformer comprises a primary winding, a first secondary winding, and a second secondary winding;

the resonant inductor and the resonant capacitor both are connected in series with the primary winding, and the first secondary winding is connected in series with the second secondary winding; the resonant inductor, the resonant capacitor, and the primary winding are connected in series between the bridge arm midpoint of the first bridge arm and the bridge arm midpoint of the second bridge arm, a first end of the first secondary winding is connected to a second end of the second secondary winding and the second DC positive terminal, a second end of the first secondary winding is connected to the first terminal of the first secondary switch, and a first end of the second secondary winding is connected to the first terminal of the second secondary switch;

wherein the drive signal for the first bridge arm, the drive signal for the second bridge arm, the drive signal for the first secondary switch, and the drive signal for the second secondary switch being controlled by the control module, to increase the voltage between the first DC positive terminal and the first DC negative terminal to the preset voltage, and during the increase in the voltage between the first DC positive terminal and the first DC negative terminal, the switches in the secondary bridge arm module being turned off at zero current, comprise:

a gain of the energy conversion circuit being determined by the control module according to a first sampled voltage, a second sampled voltage, and a turns ratio of the transformer; the first sampled voltage being a sampled voltage between the first DC positive terminal and the first DC negative terminal, and the second sampled voltage being a sampled voltage between the second DC positive terminal and the second DC negative terminal;

on condition that the gain of the energy conversion circuit is less than 1, the drive signal for the first bridge arm, the drive signal for the second bridge arm, the drive signal for the first secondary switch, and the drive signal for the second secondary switch being controlled by the control module, to make switches in the primary bridge arm module operate in a synchronous rectification mode, and to make the switches in the secondary bridge arm module turned off at zero current; and on condition that the gain of the energy conversion circuit is greater than or equal to 1, a phase-shift angle of the first bridge arm relative to the first secondary switch being determined by the control module as a first phase-shift angle, and a phase-shift angle of the second bridge arm relative to the first secondary switch being determined by the control module as a second phase-shift angle, to make the switches in the primary bridge arm module turned on at zero voltage and the switches in the secondary bridge arm module turned off at zero current, wherein the first phase-shift angle and the second phase-shift angle being equal, or the first phase-shift angle and the second phase-shift angle being not equal.

9. The vehicle of claim 8, wherein the drive signal for the first bridge arm, the drive signal for the second bridge arm, the drive signal for the first secondary switch, and the drive signal for the second secondary switch being controlled by the control module, to make the switches in the primary bridge arm module operate in the synchronous rectification mode, and to make the switches in the secondary bridge arm module turned off at zero current, comprises:

loop calculation being performed by the control module according to the first sampled voltage to obtain a voltage loop calculation result, and a signal frequency being determined by the control module according to the voltage loop calculation result; and a frequency of the drive signal for the first bridge arm, a frequency of the drive signal for the second bridge arm, a frequency of the drive signal for the first secondary switch, and a frequency of the drive signal for the second secondary switch all being determined by the control module as the signal frequency, to make the switches in the primary bridge arm module operate in the synchronous rectification mode, and to make the switches in the secondary bridge arm module turned off at zero current.

10. The vehicle of claim 8, wherein the phase-shift angle of the first bridge arm relative to the first secondary switch being determined by the control module as the first phase-shift angle, and the phase-shift angle of the second bridge arm relative to the first secondary switch being determined by the control module as the second phase-shift angle, to make the switches in the primary bridge arm module turned on at zero voltage and the switches in the secondary bridge arm module turned off at zero current, comprises:

a primary-secondary side phase-shift angle being determined by the control module according to a sampled current and a reference current;

on condition that the first phase-shift angle and the second phase-shift angle are equal, the primary-secondary side phase-shift angle being determined by the control module as the first phase-shift angle;

on condition that the first phase-shift angle and the second phase-shift angle are not equal, according to the primary-secondary side phase-shift angle and the gain of the energy conversion circuit, the phase-shift angle of the first bridge arm relative to the first secondary switch being determined by the control module as the first phase-shift angle, and the phase-shift angle of the second bridge arm relative to the first secondary switch being determined by the control module as the second phase-shift angle, to make the switches in the primary bridge arm module turned on at zero voltage and the switches in the secondary bridge arm module turned off at zero current, wherein the sampled current being a sampled current between the second terminal of the first secondary switch and the second DC negative terminal.

11. The vehicle of claim 8, wherein the control module comprises a current control loop, a voltage control loop, a voltage-controlled oscillator (VCO), and a gain judgment and phase-shift/frequency modulation module;

the current control loop is configured to perform loop calculation on a result of a subtraction operation between the sampled current and the reference current, and output a primary-secondary side phase-shift angle;

the voltage control loop is configured to perform loop calculation on a result of a subtraction operation between the first sampled voltage and a reference voltage, and output a voltage loop calculation result;

the VCO is configured to calculate a signal frequency according to the voltage loop calculation result;

the gain judgment and phase-shift/frequency modulation module is configured to calculate the gain of the energy conversion circuit according to the first sampled voltage and the second sampled voltage;

the gain judgment and phase-shift/frequency modulation module is further configured to, on condition that the gain of the energy conversion circuit is less than 1, determine a frequency of the drive signal of the first bridge arm, a frequency of the drive signal of the second bridge arm, a frequency of the drive signal of the first secondary switch, and a frequency of the drive signal of the second secondary switch all as the signal frequency; and the gain judgment and phase-shift/frequency modulation module is further configured to, on condition that the gain of the energy conversion circuit is greater than or equal to 1, determine both the first phase-shift angle and the second phase-shift angle as the primary-secondary side phase-shift angle, or calculate the first phase-shift angle and the second phase-shift angle according to the gain of the energy conversion circuit and the primary-secondary side phase-shift angle.

12. The vehicle of claim 8, wherein on condition that the gain of the energy conversion circuit is greater than or equal to 1, and the first phase-shift angle and the second phase-shift angle are not equal, the first phase-shift angle and the second phase-shift angle are determined according to the following formulas:

$$D_{\Phi 1} = D_\alpha - (1 - D_{y1});$$

$$D_{\Phi 2} = D_\alpha;$$

$$D_\alpha = (1 - D_{y1} + 2D_\Phi)/2;$$

$$\text{if } D_\Phi < D_{\Phi B}, \text{ then } D_{y1} = k \times (2D_\Phi + 1)/(2 - k);$$

$$\text{if } D_\Phi \geq D_{\Phi B}, \text{ then } D_{y1} = [2 \times D_\Phi \times (1 - k) + 2k - 1]/k;$$

$$\text{wherein } k = 1/Ge; D_{\Phi B} = (1 - k)/2; Ge = V_{HV\_FB}/(n \times V_{LV\_FB});$$

Ge is the gain of the energy conversion circuit, $D_\Phi$ is the primary-secondary side phase-shift angle from loop calculation, $D_{\Phi 1}$ is the first phase-shift angle, $D_{\Phi 2}$ is the second phase-shift angle, n is the turns ratio of the transformer, $V_{HV\_FB}$ is the first sampled voltage, $V_{LV\_FB}$ is the second sampled voltage.

13. The vehicle of claim 8, wherein the signal frequency is positively correlated to the gain of the energy conversion circuit.

* * * * *